May 9, 1950      V. M. STONE      2,507,058
OIL WELL FISHING TOOL
Filed March 11, 1949      2 Sheets-Sheet 1
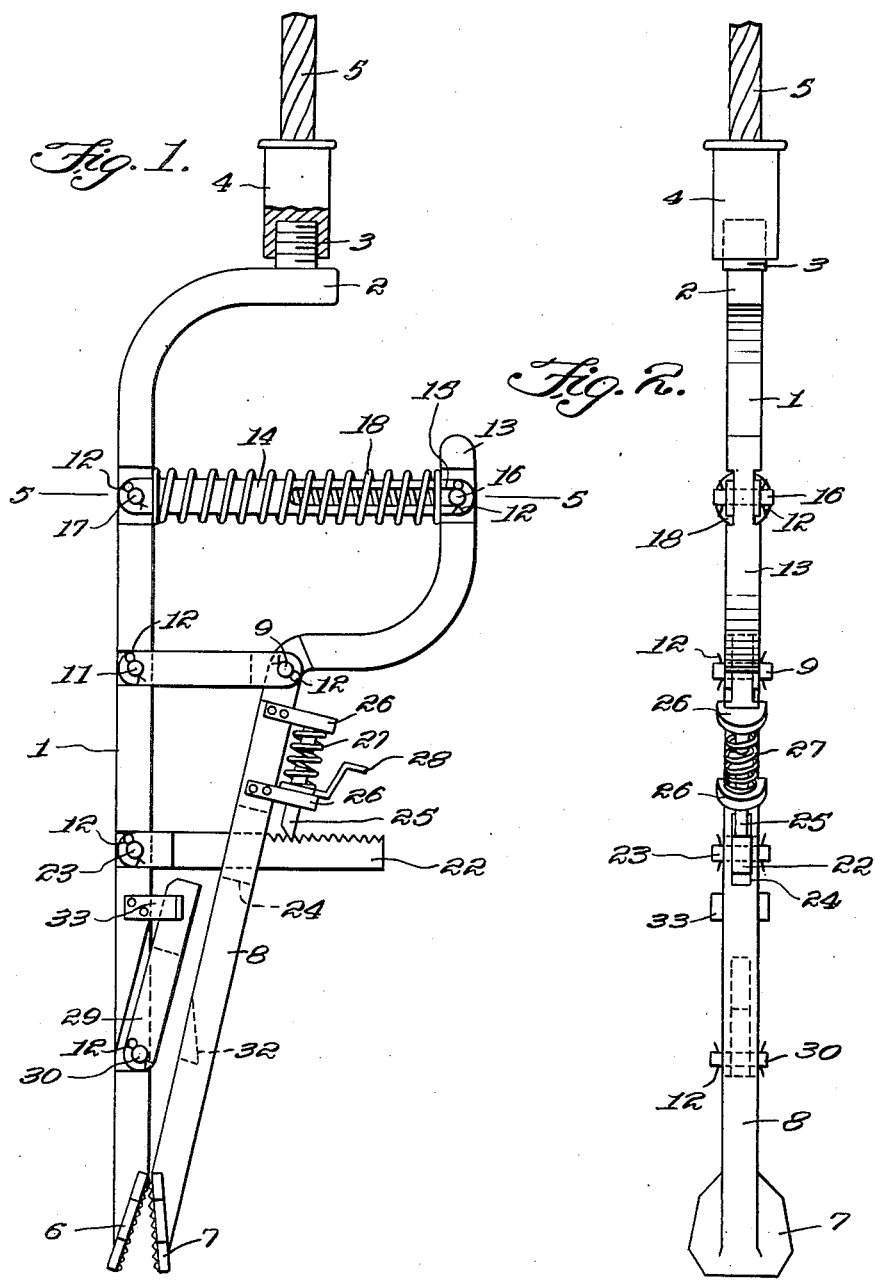
INVENTOR.
Vonden M. Stone,
BY Victor J. Evans & Co.
ATTORNEYS

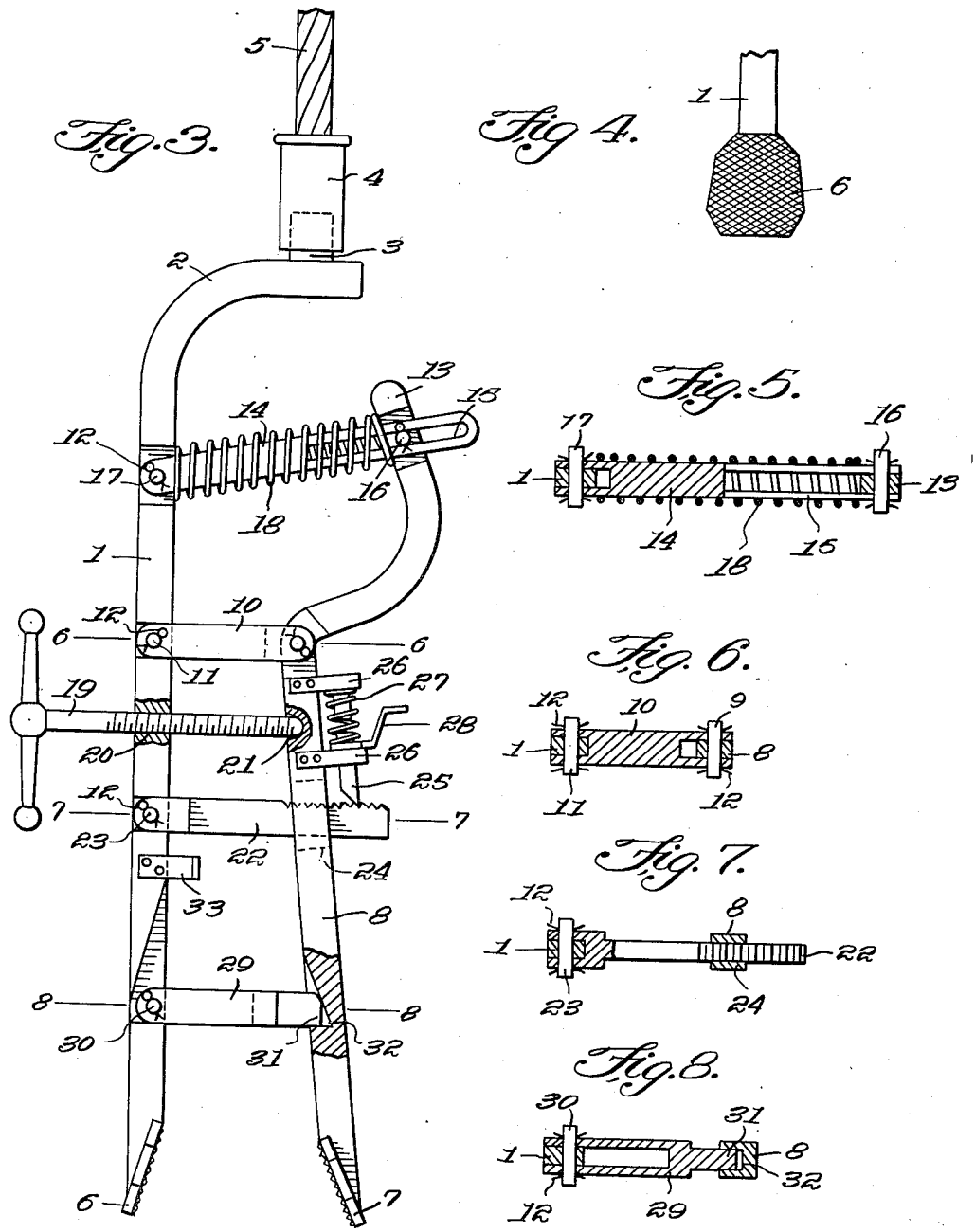

Patented May 9, 1950

2,507,058

UNITED STATES PATENT OFFICE 2,507,058

OIL WELL FISHING TOOL

Vonden Moore Stone, Sharon, W. Va.

Application March 11, 1949, Serial No. 80,918

5 Claims. (Cl. 294—99)

The present invention relates to the general class of hand and hoist line implements for use in the oil production industry, and more specifically to an improved fishing tool for oil wells in which an open grapple hook of the fixed and pivoted jaw type is automatically closed by impact of the fishing tool upon a lost string tool or other removable obstruction within an oil well. The fishing tool is suspended from a hoist line for impact against the obstruction, and when the jaws of the grapple hook are automatically closed upon the obstruction, the fishing tool and its suspended load is lifted by use of the cable from the oil well.

The novel fishing tool of my invention includes a minimum number of parts that may be manufactured with facility and low cost of production, and the parts may be assembled with convenience, to assure an implement of this character that is simple in construction and operation, which may readily be manipulated with a minimum expenditure of time and labor in recovering lost parts of the drilling equipment, and which is reliable in the performance of its functions.

With this end in view, the invention consists in certain novel features of construction and combinations and arrangements of parts as will hereinafter be described and more particularly set forth in the appended claims.

In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and mechanical structures, within the scope of my claims, without departing from the principles of the invention.

Figure 1 is a view in side elevation of a fishing tool embodying my invention, with the jaws closed; and Figure 2 is an edge view as seen from the right of Fig. 1.

Figure 3 is a side elevation, with parts in section showing the jaws opened for grappling an obstruction; and Figure 4 is a face view of one of the jaws.

Figure 5 is a sectional detail view at line 5—5 of Fig. 1; Figure 6 is a sectional view at line 6—6 of Fig. 3; Figure 7 is a sectional view at line 7—7 of Fig. 3; and Figure 8 is a sectional view at line 8—8 of Fig. 3.

In this preferred form of the invention, the various parts, which are manufactured of suitable materials, and provided with smooth working-joints that are compactly arranged to adapt the tool for facile use in a well, include a main supporting bar 1 having an upper angular arm 2 that terminates in an integral threaded stud 3 by means of which the fishing tool is detachably fastened in a socket 4 on the lower end of the usual cable or rope 5.

The stud and socket are alined with the longitudinal axis of the tool and the suspending cable or rope so that the fishing tool may dangle freely within the well tube, and the center of gravity of the tool alined with the cable.

The lower end of the supporting bar 1 is fashioned with a grappling jaw 6 that forms a relatively stationary member of the grapple, and jaw 6 coacts with a complementary movable jaw 7 integral with the lower end of a pivoted bar 8 that is fulcrumed by pivot bolt 9 on one end of a link 10, while the other end of the link is pivotally mounted on the bar 1 at 11. Cotter keys or pins 12 are utilized as quick-detachable fastening means for the pivot bolts throughout the fishing tool, for use in adjusting and fastening the joints.

The upper end of the pivot bar 8, above the fulcrum 9 terminates in an angular spring pressed arm 13 that is connected to the supporting arm 1 by a forked cross link 14 having longitudinal slots 15 at one end, the walls of the slots being pivotally and slidably mounted on a pin 16, and the other end of the link is pivotally anchored on the supporting bar 1 by pin 17. For projecting the lever arm 13 of the pivot bar and thereby closing the movable jaw 7 toward the relatively stationary jaw 6 an operating spring 18 is coiled about the guide link 14 and interposed between the supporting bar and the lever arm, and the pivot bar swings on its fulcrum 9 within the range of the two positions shown in Figs. 1 and 3.

The fishing tool is manually set in operative position with the operating spring compressed and the jaws open in suitable manner, as by means of an auxiliary spreader or hand tool 19 that is threaded through a tapped hole 20 in the supporting bar to engage its end in a recess or seat 21 of the pivot bar. By turning the threaded tool or screw bar the pivot bar is swung on its fulcrum 9, and a spring-pressed detent device is employed in connection with a rack bar for locking the pivot bar in position for temporarily locking the pivot bar in extended position and permit withdrawal of the tool 19 from the supporting bar.

For this purpose a rack bar 22 is pivotally mounted at 23 on the supporting bar, and the toothed portion of the rack bar is supported in and projects through a slot 24 of the pivot bar for coaction with a spring pressed detent or pawl 25 that is mounted in bearings 26 rigid with the bar and the detent is resiliently pressed into engagement with the rack bar by means of spring 27. For temporarily locking the detent and rack bar to prevent excessive spreading of the pivot bar, a bolt or key 28 may be withdrawn from its present seat in Fig. 3, inserted through a hole in the lower end of the depressed pawl, and engaged in an alined recess in the pivot bar, and after the key has performed its functions, it is removed.

While the pivot bar is thus temporarily retained in outspread position, an impact-releasable brace or trigger 29 of forked or bifurcated shape and pivoted at 30 in the supporting bar is swung down to bring its free end 31 into a socket groove 32 in the inner face of the pivot bar. The trigger is retained in inoperative position by means of a snap spring 33 mounted on the supporting bar, and it is swung manually down to operative position to hold the pivot bar outspread against the tension of the operating spring and the movable jaw spaced from the relatively stationary jaw.

For extracting an obstruction the fishing tool is lowered to the obstruction, then elevated a short distance and the cable is slacked, after which the tool is permitted to drop. The brace or trigger 29 strikes the obstruction and the impact knocks upwardly the trigger from its seat 32, thus permitting the operating spring to expand and close the jaw 7 on the obstruction, thus grappling the obstruction so that it may be lifted with the fishing tool from the well.

Having thus fully described my invention, what I claim as new and desire to secure by Letters Patent is:

1. In a well driller's fishing tool, the combination with a supporting bar having a grapple jaw and a pivoted bar having a complementary jaw, of coacting means on the bars for resiliently retaining the pivoted bar in outspread position, a compression spring coacting with the bars tending to close the jaws, and an impact-releasable trigger coacting with the bars to retain the jaws in open position.

2. In a well driller's fishing tool, the combination with a supporting bar, a pivoted bar and complementary jaws on said bars, of a link uniting the bars and a compressed operating spring mounted on the link and tending to close the jaws, an impact-releasable trigger pivoted on one bar, and a seat in the other bar for frictional engagement of the free end of the trigger.

3. In a well driller's fishing tool having a supporting bar a pivoted bar and grapple jaws on the bars, the combination with a rack bar pivotally mounted on the supporting bar and a spring pressed detent on the pivoted bar for coaction therewith, of an impact-releasable trigger coacting with the bars to hold the jaws open, and a compression coacting with the bars to close the jaws when the trigger is released.

4. In a well driller's fishing tool, the combination with a supporting bar, a pivot bar, a fulcrum link uniting the bars, and complementary grapple jaws on the bars, of an impact-releasable brace pivotally mounted on one bar and frictionally engaging the other bar adjacent their lower ends, a slotted guide link uniting the upper end of the pivot bar with the supporting bar, and a compressed operating spring mounted on the link adapted to close the jaws when the brace is released.

5. In a well driller's fishing tool of the impact type, the combination with a supporting bar having an inturned arm and a threaded stud for engagement with the socket of a cable, a pivoted bar having an upper angular arm, a fulcrum link uniting the bars, and complementary grapple jaws on the lower ends of the bars, of a brace pivotally mounted on the supporting bar and engaged in a recess of the pivot bar adjacent the grapple jaws, a slotted guide link uniting the angular arm with the supporting bar, and a compressed operating spring mounted on the guide link.

VONDEN MOORE STONE.

No references cited.